3,404,091
OLEAGINOUS COMPOSITIONS
Herbert Takashima, New York, N.Y., and Edward N. Kresge, Elizabeth, and Darrell W. Brownawell, Scotch Plains, N.J., assignors to Esso Research and Engineering Company, a corporation of Delaware
Filed Mar. 21, 1966, Ser. No. 535,818
3 Claims. (Cl. 252—50)

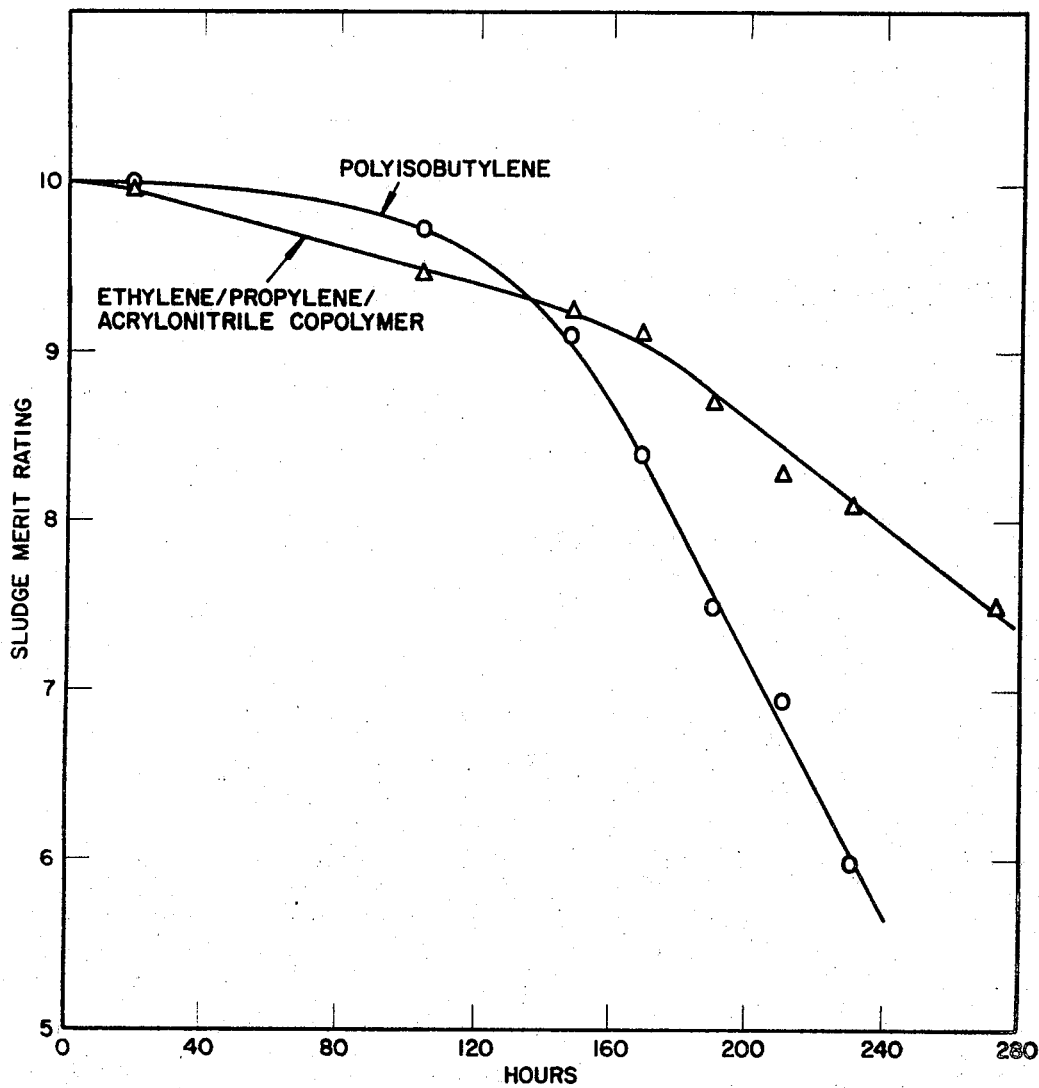

ABSTRACT OF THE DISCLOSURE

Multi-functional additives, e.g., sludge dispersants, V.I. improvers, etc., are prepared by hydroperoxidizing an ethylene-alpha-olefin copolymer, e.g., ethylene-propylene copolymer, and subsequently grafting thereto a polar monomer such as methylmethacrylate, acrylonitrile, etc. The resulting additives may be employed in oleaginous compositions such as gasoline, middle distillate fuels, or lubricating oils.

---

The present invention relates to novel additives which improve the sludge dispersancy, as well as improving the viscosity index characteristics and other properties of eleaginous compositions and to the preparation of such additives. Broadly, the novel additives are graft polymers prepared by grafting monomers containing at least one vinylidene group to hydroperoxidized copolymers of ethylene and at least one other alpha olefinic monomer. The major portion of the oileaginous compositions comprise gasoline, middle distillate fuel, or lubricating oil.

Lubricants for modern, high compression, piston-type internal combustion engines necessarily have high detergency properties, i.e., they must have efficient sludge dispersant action and high resistance, in order to free the engines from deposits of varnish, sludge, and coke-like materials. Generally, a heavy duty detergent type lubricating oil is employed in such engines in order to maintain the desired high degree of engine cleanliness and thereby promote longer engine life. Detergent properties in fuel oils, jet fuels, gasolines, and heating oils are also desirable in order to minimize carbonaceous deposits in lines, pumps, filters and the like.

In the past, the majority of detergent sludge dispersants and antioxidant materials which have been developed for use in these types of oleaginous compositions, particularly those employed as fuels or lubes for internal combustion engines, have been metallic derivatives such as alkaline earth metal sulfonates, alkaline earth metal salts of alkenol sulfides, colloidal dispersions of metallic carbonates such as alkaline earth metal carbonates, and the like. While these additives have generally been highly satisfactory as sludge dispersants and detergents, in many instances the presence of inorganic compounds gave rise to undesirable ash contents in the additives. The ash tends to accumulate in the combustion chambers of the engine and cause preignition, spark plug fouling, valve burning and similar undesirable conditions. For this reason, much attention has been devoted to producing an effective dispersant which is ash free and thus essentially eliminates the cause of preignition, spark plug fouling, valve burning, and the like. The present invention advantageously, provides an effective oil-soluble, ash-free detergent type inhibitor and dispersant and a process for preparing such composition.

The additive compositions of this invention are also surprisingly effective in markedly improving the viscosity index of the oleaginous compositions to which they are added while concomitantly having improved thickening power and shear stability relative to comparable additives. This multi-functional utility is especially expedient in view of the limited utility of conventional additives.

The additive compositions of this invention can be prepared by first preparing a hydroperoxidized copolymer of ethylene and at least one other alpha olefinic monomer and subsequently grafting this material with a monomeric compound which contains at least one vinylidene group. As will be hereinafter more fully described, a number of methods can be employed for finally producing the grafted copolymer. When referring to monomers containing at least one "vinylidene group," the instant invention contemplates any monomer containing at least one vinylidene group exclusively or any monomer containing at least one vinylidene group in addition to one or more other inert, i.e. non-interfering group.

The present invention employs a copolymer of ethylene and at least one other alpha monoolefin having the structure R—CH=CH$_2$ where R in an alkyl radical, branched or unbranched, preferably, unbranched and preferably not having more than eight carbon atoms.

Representative examples of the preferred alpha olefin having the structure R—CH=CH$_2$ wherein R is a C$_1$ to C$_8$ alkyl radical include: propylene 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; and 5,6,6-trimethyl-1-heptene.

Conventionally, these copolymers are prepared using Friedel-Crafts type catalysts or using the Ziegler type catalysts. These reactions are well known and are conventionally employed. Accordingly, the present invention is not predicated upon the particular catalyst system employed in preparing the copolymer starting materials.

The copolymerization reaction of ethylene with at least one other olefinic monomer results in soluble copolymers in excess of 50 and up to about 500,000 viscosity average molecular weights. The catalytic systems, temperatures, pressures, reaction diluents, feed stock compositions and the like are described in detail in the prior art. The catalysts employed are complexes or mixtures of a reducing metal compound with a reducible metal compound. The preferred reducing metal compound is an organo aluminum compound having the general formula:

$$(R)_xAl(X)_y$$

where $x$ and $y$ are 1 or 2 and the sum of $x$ plus $y$ is 3, each R is a hydrogen atom, a C$_1$–C$_6$ alkyl or aryl radical and X is a hydrogen or halogen atom or an alkoxy, aryloxy, secondary amino, amido, mercapto group, and the like. Specific examples of such aluminum compounds are: aluminum triethyl, aluminum trimethyl, aluminum triisopropyl, aluminum diethyl chloride, aluminum diethyl bromide, aluminum ethyl dichloride, aluminum ethyl dibromide, ethyl aluminum dihydride, diethyl aluminum hydride, ethoxy aluminum diethyl, aluminum diphenyl chloride, aluminum triphenyl and aluminum hydride. The preferred aluminum compounds are diethyl aluminum chloride and an admixture of diethyl aluminum chloride with ethyl aluminum dichloride.

The reducible metal compound is a compound of a metal selected from the group consisting of: IVa, Va, VIa, and VII of the Periodic Chart of the atoms as described by Henry D. Hubbard, 1956 revised edition. Such elements include: titanium, zirconium, hafnium, thorium, uranium, vanadium, tantalum, chromium, molybdenum, tungsten, iron, cobalt, nickel and the like. Examples of the compounds of these metals which may be used include the chlorides or bromides or oxy chlorides or oxy bromides, oxides and hydroxides, alcoholates, acetates and benzoates. The preferred salts are titanium tetrachloride, titanium oxychloride, vanadium tetra and vanadium oxychloride. The catalyst mixture is prepared by simply mixing the aluminum compound with the reducible heavy metal compound in the presence of an inert organic reaction diluent. At least 1 mole of the metal compound having reducing properties is admixed per mole of reducible metal compound. Preferably the molar ratio of the reducing metal compound to the reducible metal compound is in the range of about 1.5:1 to about 6:1. A sufficient amount of this catalytic mixture is added so that about 0.2 and about 15 wt. percent of the catalyst components are present in the reaction mixture.

The polymerization reaction is carried out generally in the range of between about 10° and about 100° C. with agitation at atmospheric pressure or under superatmospheric pressures up to as high as 2,000 p.s.i.g. The time of reaction varies between about 0.2 and about 15 hours, preferably between about 0.5 and about 5 hours. The amounts of ethylene to alpha olefin fed to the reaction may vary between about 15 mole percent to 85 mole percent alpha olefin, preferably between about 30 mole percent and about 60 mole percent alpha-olefin.

In the case of the preparation of the terpolymers, the two monomeric feed components used in making the ethylene-propylene copolymer are usually employed and the same catalyst reaction conditions, etc. are employed. In addition, however, in the case of the terpolymer, a third unsaturated monomer, namely nonconjugated diolefin, is employed which may be one or more of the following: cyclopentadiene, 2-methylene-5-norbornene, a nonconjugated hexadiene, or any other alicyclic or aliphatic nonconjugated diolefin having from 6 to 15 carbon atoms per molecule such as 2-methyl norbornadiene, 2,4-dimethyl-2,7-octadiene, and 3-(2-methyl-1-propene) cyclopentene. The aforementioned terpolymers are also well known in the art. The amount of the third monomer present in the feed is usually within the range of between about 0.5 and about 20 mole percent, preferably between about 1 and about 7 mole percent, based on the total amount of ethylene and propylene present.

Both with regard to the copolymerization and terpolymerization reaction, the preferred reaction conditions involve the use of various solvents as the organic diluent and reaction medium. Various solvents may be used in the copolymer preparation and they include aliphatic, naphthenic, aromatic and halogenated hydrocarbon solvents, mineral oils, or an excess of the higher alpha olefin such as propylene may be used. Examples of solvent include n-hexane, heptane, propane, cyclohexane, benzene, toluene, xylenes, tetrachloroethylene, decalin and chlorobenzenes, preferably, n-hexane.

The use of a temperature of about 70° C., a pressure of about 60 p.s.i.g., a time of reaction of about 30 minutes: using 0.2 wt. percent in the reaction mixture of a catalyst composed of 1 mole of vanadium oxy trichloride and 4 moles of diethyl aluminum chloride. A typical feed stock in the case of the copolymerization reaction involves about 50 wt. percent of ethylene and about 50 wt. percent of propylene and in the case of a terpolymerization, about 48 wt. percent ethylene, about 48 wt. percent propylene, and about 4 wt. percent 2-methylene-5-norbornene. Typically the copolymer has a viscosity average molecular weight of about 150,000 in which the range or distribution of molecular weight is between about 50 and about 500,000. Typically a terpolymer, under these conditions, also has a viscosity average molecular weight of about 150,000 with a molecular weight range distribution of between about 50 and about 500,000.

The ethylene monomer unit concentration in the copolymer ranges in general from about 20% to about 85% by weight, preferably 30% to 75% by weight. Copolymers having concentrations of ethylene monomer units outside these ranges tend to be insoluble in lubricating oils, fuels and the like. The third monomer component generally comprises no more than 20% by weight of the terpolymer, i.e. about 0.5 to 20% by weight and preferably 1 to 7% by weight.

In accordance with this invention, the heretofore mentioned copolymers, for example, ethylene-propylene copolymers, or terpolymers, for example, the terpolymer of ethylene, propylene and 2-methylene-5-norbornene, may be subjected to a controlled oxidation using molecular oxygen or a gas such as air which contains molecular oxygen with or without the aid of substances which have heretofore been employed and are known as free radical initiators. Such free radical initiators which may be employed may be represented, for example, by ozone, cumene hydroperoxide, dicumyl peroxide, benzoyl peroxide, azobisisobutyronitrile, sodium persulfate, diethyl peroxydicarbonate, tertiary butyl hydroperoxide, and the like.

The controlled oxidation may be carried out preferably, although not necessarily, in the presence of a suitable solvent such as benzene, chlorobenzene, tertiary butyl benzene, normal pentane, normal hexane, normal heptane or, when using a solvent which is not inert as those mentioned but which will itself be oxidized such as cumene, diisopropyl benzene, or decalin; the starting material, i.e., the material to be oxidized, may be any of the heretofore mentioned polymeric materials which contain at least one, and preferably several, tertiary carbon atoms per molecule which tertiary carbon atoms contain a hydrogen directly connected thereto.

The solution is usually maintained at a temperature between about 40 and about 150° C., preferably between about 40 and about 100° C., more preferably between about 50 and about 70° C. for a period of time ranging between about 1 hour and about 14 hours, preferably between about 2 hours and about 9 hours. It is found that the more vigorous the oxidation conditions and the longer the reaction period, the larger the amount of hydroperoxide (HOO) radicals introduced into the starting material. The reaction conditions may be varied over considerable ranges and the correlation may be varied between the reaction temperature and time of reaction. It is sufficient, however, if at least one hydroperoxide radical (HOO) is introduced into each molecule of the starting material. For best results, in the ultimate use of the products obtained, i.e., for use in oleaginous compositions, it is desirable that a sufficient number of tertiary carbon atoms containing hydrogen atoms attached directly thereto are present in each molecule so that upon subsequent treatment of the resultant hydroperoxide modified polymer with a vinylidene containing polar monomer, a graft polymer is formed and isolated. The free radical initiators are removed from the hydroperoxide polymer derivatives before the grafting operation is initiated. The resultant hydroperoxidized polymers have a viscosity average molecular weight ranging from about 25,000 to about 100,000.

The thus hydroperoxidized copolymers or terpolymers are treated when substantially free of oxygen and peroxidizing initiators and while in solution in any one of the solvents heretofore mentioned with between about 2 and about 30 weight percent of a polar monomer containing at least one vinylidene group ($>C=CH_2$) or ethylenic unsaturation per molecule. If the peroxidation catalysts or initiators are allowed to remain during this second step of the operation, the final product is not always 100% graft polymer but a mixture of graft polymer and homo polymer. Homopolymerization can take place to the extent of some 50% of the finally recovered solid product, hence, it is desirable that this homo polymer formation be minimized or avoided. The graft polymerization is accomplished using any of the polar monomeric vinylidene-containing compounds among which may be the following: acrylonitrile, methlymethacrylate, vinyl acetonitrile, methylacrylamide, 2-ethyl hexylacrylate and the like.

The graft polymerization step is generally carried out at a temperature ranging between about 35° and about 80° C., preferably between about 45° and 70° C., for a period of time between about 1 hour and about 15 hours and, for best yields of the resultant grafted copolymers or terpolymers, the grafting reaction is carried out in the presence of a redox catalyst. These conditions are generally described as being carried out in the substantial absence of extraneous free oxygen and any one of a number of well-known redox catalysts may be employed such as, for example, benzoin plus iron octonate.

The final graft hydroperoxide copolymer or terpolymer, in order to suitably function as the multi-functional additive hereinbefore referred to has a viscosity average molecular weight ranging from about 25,000 to about 100,000, preferably about 40,000 to about 85,000. The content of the various components, i.e. ethylene alpha olefin hydroperoxide groups, grafted units, etc. are as previously disclosed.

Unless otherwise specified, the term "molecular weight" as used herein means molecular weight based on viscosity measurement. The molecular weights indicated herein and in the claims hereof were estimated on the basis of viscosity measurement at 135° C. of solutions which contained 0.5 milligram of polymer per milliliter of decalin.

In preparing the mixture of the novel additive-oleaginous compositions, e.g., mineral lubricating oil and the grafted derivatives of the hydroperoxidized copolymers and terpolymers, the additives should be employed in concentrations within the range varying between about 0.01 and about 10 wt. percent, preferably 0.1 and 2.0 wt. percent, most preferably between about 0.5 and about 1.0 wt. percent. Conveniently these additives may be dissolved in from 10 to 20 wt. percent concentration in a solvent refined neutral lubricating oil of from 100–150 SUS viscosity for ease in blending back to the desired concentration in the finished lubricating oil formulation. The prepartion of the concentration simply involves comminuting the polymer and stirring it into the lubricating oil at a suitable temperature of from 140°–180° F. for a sufficient length of time to effect complete solution. These grafted copolymers and terpolymers are potent viscosity index improvers and may be used alone in lubricating oils, however, it is contemplated by the instant invention to employ these novel additives in conjunction with conventional V.I. improvers, such as, polyisobutylene, copolymers of ethylene with vinyl acetate, copolymers of alkyl methacrylates and alkyl fumarates, or the copolymers of vinyl acetate, maleic anhydride, and alkyl fumarates. A particularly useful combination of additives involves about 0.1 to about 5 wt. percent of polyisobutylene having a viscosity average molecular weight of between about 100,000 and about 200,000 coupled with a like amount of the herein described novel oil additives. The conventional lubricating oils employed are the synthetic hydrocarbons as well as the usual natural mineral lubricating oils derived from paraffinic, naphthenic, asphaltic, or mixed base crude oils obtained by conventional suitable refining methods.

The following examples serve merely as illustrations of the character or nature of this invention.

In such examples, comparisons are made between the utility of the novel graft hydroperoxidized copolymers and terpolymers of this invention and the utility of polyisobutylene, a commercially available viscosity index improver. This polyisobutylene may have a viscosity average molecular weight of between about 100,000 and about 200,000 generally of about 130,000 molecular weight. Customarily the commercial product is prepared through the use of a Friedel-Crafts type polymerization catalyst, usually boron trifluoride or aluminum chloride, while maintaining temperatures substantially below 0° C., such as —40° C., i.e. the boiling point of propane in which the reactant monomer isobutylene may be contained. Much lower temperatures such as —103° C., i.e. the boiling point of ethane, may also be employed.

EXAMPLE 1

This example serves to illustrate the preparation of a typical hydroperoxidized ethylene-alpha olefin graft copolymer of this invention, specifically, a hydroperoxidized ethylene-propylene acrylonitrile graft copolymer.

One (1.0) pound of ethylene-propylene (50% ethylene 50% propylene) copolymers having a viscosity average molecular weight of 155,000 in 13 pounds heptane was oxidized (22 mg. $O_3$/l. $O_2$) for six hours at 70° C. The reaction temperature was cut to 50° C. and the reaction mixture was purged with nitrogen for 2 hours. After purging was complete, 80 cc. of acrylonitrile, 0.75 gm. benzoin, and 1.71 gms. of iron acetonate 6% was added and the reaction mixture stirred overnight at 50° C. The reaction was terminated with 0.1 wt. percent di-t-butyl phenol stirring for an hour. The heptane was then steam stripped and the polymer was milled and dried at 250° F. The final graft polymer product had a $M_v$ of 27,000 and analyzed for 0.6% nitrogen.

EXAMPLE 2

The ethylene-propylene-acrylonitrile graft copolymer of Example 1 was evaluated, certain physical properties, e.g. as to shear stability as represented by sonic breakdown and by two engine tests.

The test base oil utilized, a paraffinic type base oil, of about 46.5 SUS at 210° F. and about 190 SUS at 100° F. and having a viscosity index of about 109, contained 10.5 wt. percent of the ethylene-propylene-acrylonitrile graft copolymer, or polyisobutylene, and in addition; 0.9 wt. percent of a 300 base number overbased calcium sulfonate (Bryton C–300); 3.8 wt. percent of a nitrogen based ashless dispersant (Enj–3029); 1.3 wt. percent of a dialkyl dithiophosphate (Paranox–15); 0.5 wt. percent of a lubricating oil pour depressant (Paraflow–349).

In order to compare the shear stability of the additive of this invention with a conventional additive, the relative percent of sonic breakdown of ethylene-propylene-acrylonitrile graft copolymer (EPA) was compared with that of a copolymer of methylmethacrylate and $C_{10}$ oxomethacrylate (UCAR G–120).

The sonic breakdown test method is intended solely for the examination of polymers to be used as V.I. improvers. In this method the sample under test is blended with an approved base stock to a viscosity at 210° F. of 15.0±0.5 centistokes. A portion of the blend is subjected to sonic shearing forces at a specific power input and a constant temperature for 15 minutes. Viscosities are determined on the blend both before and after the treatment; the decrease in viscosity after the treatment is a measure of the molecular breakdown of the polymer under test.

There will be an appreciable daily variation in the severity of the test. It is therefore customary to examine a blend of a standard sample of known behavior each time a test is made, and to use this as a reference to establish the correct value for the sample under test. The corrected value is reported as the percent sonic breakdown. The resulting data are as follows:

TABLE I(A)

| | Wt. percent polymer | 210° vis. SUS | Percent sonic breakdown | Measured 0° vis. | V.I. |
|---|---|---|---|---|---|
| Ethylene-propylene-acrylonitrile graft copolymer (EPA) | 1.2 | 68.0 | 14 | 12,280 | 137 |
| Methylmethacrylate oxomethacrylate copolymer | { [1] 5.91, 2.06 } | 68.2 | 41 | 10,720 | 148 |

[1] Conc. A.I.

Table I(A) clearly shows the outstanding shear stability of the ethylene-propylene-acrylonitrile polymer as shown by the low sonic breakdown.

The acrylonitrile graft copolymer of this invention was subjected to a CRC–L–38 engine test in order to determine the bearing weight loss in milligrams resulting from the use of the novel compositions in said standard L–38 engine test. As represented in Table I(B), the ethylene-propylene acrylonitrile (EPA) graft polymer of this invention easily surpassed the minimum bearing weight loss allowed, i.e. 50 mg.

TABLE I(B).—L–38 TEST RESULTS

| Polymer | Mol. wt. | Bearing wt. loss (mg.) |
|---|---|---|
| Ethylene-propylene acrylonitrile graft copolymer | 27,000 | 31.3 |

A cyclic temperature sludge test was carried out in order to determine the sludge dispersant properties of the copolymeric product of this invention. This standardized sludge test may be described as follows: The Cyclic Temperature Sludge Test is designed and is to subject test oils to conditions which have been shown to give sludge deposits similar to those obtained in stop-and-go driving such as would be experienced in taxicab operation. Briefly described, in this test a Ford 6-cylinder engine is run on a dynamometer stand through alternate cycles, the first cycle lasting five hours, at 1500 r.p.m., and the second cycle lasting two hours, at the same operating speed, with the oil sump and water jacket temperatures being slightly higher in the second cycle than in the first. The two cycles are alternated in sequence until the desired total test time has elapsed. Make-up oil is added as required so as to maintain the oil level in the crankcase at all times between about 3½ and 4 quarts. At the end of selected periods of test time, the engine is inspected by disassembling it sufficiently to permit visual examination of several of the parts, including the rocker arm assembly, the rocker arm cover, the cylinder head, the push rod chamber and its cover, the crankshaft and the oil pan. These parts are visually and quantitatively rated for sludge deposits, using a CRC sludge merit rating system in which a numerical rating of 10 represents a perfectly clean part, and the numerical scale decreases to a minimum value representing a part covered with the maximum amount of sludge possible. The several merit ratings are averaged to give an overall engine merit rating.

The oil employed in this Cyclic Temperature Sludge Test was a neutral solvent extracted Mid-Continent oil having a flash point of 450° F., an API gravity of 29.0, a pour point of +15° F., a viscosity index of 100, and a viscosity of 325–340 SUS at 100° F. and 50 SUS at 210° F. In making up the test base oil there was added 0.9% of the heretofore mentioned zinc salt of the specific dialkyl diphosphoric acid above defined. There was also added to the base oil 3.5 wt. percent of a colloidal dispersion of barium carbonate and barium nonyl phenate stabilized by a phosphosulfurized polyisobutene as a dispersant. The composition was prepared by admixing nonyl phenol with barium hydroxide and phosphosulfurized polyisobutylene so as to produce the barium nonyl phenate and the mix was finally blown with carbon dioxide so that the excess unreacted barium was converted into barium carbonate. This is a well known and conventionally employed antioxidant and detergent for lubricating oils.

This test base oil, under comparative conditions, was then subjected to the Cyclic Temperature Sludge Test; one portion of the oil containing 1% by weight of polyisobutylene, a conventional V.I. improver and the other aliquot containing 1% by weight of a similar ethylene-propylene-acrylonitrile graft polymer additive composition as that employed in Table I(A) and for the number of hours illustrated in Table I(C). As can be seen on a comparative basis, the acrylonitrile graft polymer of this invention surpasses the conventional polyisobutylene additive.

TABLE I(C).—4-103 CYCLIC TEMPERATURE SLUDGE TEST
[Sludge merit rating]

| Hours | Ethylene-propylene-acrylonitrile [1] | Polyisobutylene [2] |
|---|---|---|
| 21 | 9.96 | 10 |
| 105 | 9.46 | 9.76 |
| 147 | 9.25 | 9.10 |
| 168 | 9.11 | 8.40 |
| 189 | 8.70 | 7.50 |
| 210 | 8.30 | 6.95 |
| 231 | 8.10 | 6.0 |
| 273 | 7.50 | |

[1] $M_v = 27,000$.
[2] $M_v = 130,000$.

EXAMPLE 3

This example compares the thickening power characteristics of a hydroperoxidized ethylene-propylene-acrylonitrile graft copolymer with a commercial additive having similar utility, i.e., polyisobutylene. In this comparison, the copolymers were incorporated in amounts of about 1.0 wt. percent in a paraffinic type base oil of about 46.53 SUS at 210° F. and about 189.9 SUS at 100° F. having the viscosity index of about 109. The resulting data are set forth in Table II.

TABLE II

| Polymer | Thickening power [1] (SUS at 210° F.) | V.I. in Barosa 43 [2] |
|---|---|---|
| Ethylene-propylene-acrylonitrile graft polymer ($M_v$ 27,000) | 588.6 | 136.7 |
| Polyisobutylene ($M_v$ 130,000) | 103.6 | 137.1 |

[1] Thickening power is defined as the viscosity of a Barosa 43 oil containing 1% polymer.
[2] Barosa 43 is a mixed paraffinic and naphthenic oil of 5.46 cs. at 210° F.

The foregong data clearly show that the graft copolymer of the instant invention has a much greater thickening power in lube oil than polyisobutylene and at an essentially equal level of viscosity index improvement.

EXAMPLE 4

This example compares a hydroperoxidized ethylene-propylene-methylmethacrylate graft copolymer of the instant invention with the polyisobutylene and an unmodified ethylene-propylene copolymer.

The ethylene-propylene-methylmethacrylate graft copolymer was prepared by a method similar to that of Example 1 except that methylmethacrylate was substituted for acrylonitrile. The resulting graft polymer had a viscosity average molecular weight of about 83,000 and contained 5.74 wt. percent oxygen which corresponds to 25.5 wt. percent methylmethacrylate in the graft polymer. The polymer contained no homo polymer of methylmethacrylate. The various copolymers were incorporated in an amount of about 1.0 wt. percent in a paraffinic type base oil similar to that of Example 3. The resulting data are presented in Table III.

TABLE III

| Polymer | Thickening power (SUS at 210° F.) | Percent sonic breakdown |
|---|---|---|
| Ethylene-propylene-methylmethacrylate graft copolymer | 191.5 | 21.8 |
| Ethylene-propylene copolymer | 111 | 10.0 |
| Polyisobutylene | 103.6 | 27.6 |

The data of Table III clearly show that the ethylene-propylene-methylmethacrylate graft copolymer of this invention has extremely greater thickening power than conventional polyisobutylene and ethylene-propylene additives. This advantage is accomplished while exhibiting excellent shear stability as represented by sonic breakdown, when compared with polyisobutylene.

What is claimed is:

1. A lubricating oil composition comprising a major amount of a mineral lubricating oil, and about .5 to 2 wt. percent of an oil-soluble viscosity index improver having sludge dispersing ability which is a copolymer consisting essentially of ethylene and propylene containing about 20 to 85 wt. percent ethylene, which copolymer is hydroperoxidized and then grafted with about 2 to 30 wt. percent of a vinylidene polar monomer selected from the group consisting of acrylonitrile and methylmethacrylate, said graft polymer having a viscosity average molecular weight of about 25,000 to 100,000.

2. A lubricating oil composition according to claim 1, wherein said polar monomer is methylmethacrylate.

3. A lubricating oil composition according to claim 1, wherein said polar monomer is methmethacrylate.

References Cited

UNITED STATES PATENTS

| | | | |
|---|---|---|---|
| 2,837,496 | 6/1958 | Vanderberg | 252—51.5 |
| 2,901,458 | 8/1959 | Banes et al. | 252—56 |
| 3,067,163 | 12/1962 | Bauer | 252—51.5 X |
| 3,088,931 | 5/1963 | Scanley et al. | 252—51.5 X |
| 3,316,177 | 4/1967 | Dorer | 252—51.5 |

FOREIGN PATENTS 822,632   10/1959   Great Britain.

PATRICK P. GARVIN, *Primary Examiner.*